United States Patent Office 3,023,184
Patented Feb. 27, 1962

3,023,184
SOLUTION OF POLYESTER IN PYRROLE AND PROCESS FOR MAKING SAME
Hobson D. De Witt, New Wilmington, Pa., and Arthur B. Beindorff, Decatur, Ala., assignors to The Chemstrand Corporation, Decatur, Ala., a corporation of Delaware
No Drawing. Filed Aug. 20, 1959, Ser. No. 834,935
20 Claims. (Cl. 260—30.2)

This invention relates to new compositions of matter and more particularly to new and useful compositions of matter comprising solutions or "dopes" of synthetic linear condensation polyesters. It is further concerned with new compositions of matter which are capable of being formed into useful articles such as ribbons, films, bristles, fibers, filaments and the like.

This application is a continuation-in-part of our copending application, Serial No. 602,897, filed August 8, 1956, now abandoned.

For the sake of simplicity, the present invention will be described as it is applied in the manufacture of fibers and filaments. However, the invention is not to be limited thereby except insofar as it may be limited by the appended claims.

Various methods are known for converting the polyesters described above into filaments and fibers, such as the so-called melt-spinning, wet-spinning and dry-spinning methods.

Melt-spinning comprises melting chips of a polyester on a heated grid and passing the melt through a filter bed of small particles, such as sand, and the like. Subsequently, the melt is forced through a spinneret and the filaments so formed are cooled. However, melt-spinning has certain disadvantages such as the employment of high temperatures which makes the addition of plasticizers and modifying agents difficult, because there is a tendency for the added agents to discolor and decompose.

In the dry-spinning method the polyester is dissolved in a solvent therefor and extruded through a spinneret in the usual manner. The solution is extruded into an atmosphere of inert gas which may be heated. The motion of the inert gaseous atmosphere, the extruded fiber and the application of heat all aid in disposing of the volatile solvent.

The wet-spinning method in which a solution of polyester is extruded into a bath containing a non-solvent for the polyester has a number of advantages over the melt-spinning method. For example, the wet-spinning method is generally more economical and can be carried out at lower temperatures. Therefore, plasticizers and other agents may be added with a minimum tendency toward discoloration and decomposition. Furthermore, certain types of plasticizers and modifying agents tend to be less compatible for blending in a melt at high temperatures, whereas they can be readily incorporated in a polyester solution at a low temperature. Solutions offer the further advantage in that they may be easily cast into films or coatings of uniform thickness. This is extremely difficult with a molten composition because of its relatively high viscosity.

The wet-spinning method, however, has not been employed commercially because of the lack of suitable solvents. Generally, polyesters are insoluble in the more common organic solvents. From the standpoint of low cost, solvent power, non-corrosiveness and ease of recovery, there is a scarcity of suitable solvents for the more usual types of polyesters.

Accordingly, the principal object of the instant invention is the preparation of polyester solutions or "dopes" which are capable of being transformed into shaped articles.

Another object is to provide synthetic linear condensation polyester compositions in solutions which are stable and have non-gelation characteristics.

Another object of the invention is to prepare spinnable solutions of polyester compositions.

Other objects and advantages of the invention will be apparent from the following description.

The foregoing objects are accomplished by dissolving the synthetic linear condensation polyesters in pyrrole.

Solutions of high solids content and good stability can be prepared by mixing the polyester in the compounds mentioned hereinabove and heating to a temperature in a range of 90° C. to the boiling point of the mixture. If desired, the mixture may be stirred while heating. However, stirring is not necessary to effect solution, although it has been found that the polyester goes into solution more smoothly and evenly and with a greater rate of speed when stirring is employed. Whether stirring is employed or not, a miscible mixture of the synthetic linear condensation polyester is attained. The maximum solids concentration of the polyester that can be obtained in the solution and the viscosity of the solution depend upon the nature of the polyester, the solvent mixture and the temperature. In the manufacture of filaments and fibers a polyester having a molecular weight of at least 10,000 is employed in making a solution. Lower molecular weight polyesters may be utilized when the solution to be formed is to be used as a coating or as a lacquer. In preparing solutions or "dopes" suitable for spinning into filaments and fibers, 10 to 25 percent by weight of the polyester, based on the total weight of the solution, is suitable. While it is preferred to employ 10 to 25 percent by weight, based on the total weight of the solution, of the polyester in the solvent when the solution is to be used for the preparation of fibers and filaments, it is to be understood that as little as 5 percent or less and as much as 30 percent or more of the polyester may be utilized when the solution is to be employed for other purposes, such as a coating or lacquer and the like, or when lower or higher molecular weight polyesters are to be dissolved in the new solvents of this invention. The amount of any specific polyester, which can be dissolved in the solvents of this invention, will be readily evident to those skilled in the art.

The synthetic linear condensation polyesters contemplated in the practice of the invention are those formed from dicarboxylic acids and glycols, and copolyesters or modifications of these polyesters and copolyesters. In a highly polymerized condition, these polyesters and copolyesters can be formed into filaments and the like and subsequently oriented permanently by cold drawing. The polyesters and copolyesters specifically useful in the instant invention are those resulting from heating one or more of the glycols of the series $HO(CH_2)_n$—$OH$, in which $n$ is an integer from 2 to 10, with one or more dicarboxylic acids or ester-forming derivatives thereof. Among the dicarboxylic acids and ester-forming derivatives thereof useful in the present invention there may be named terephthalic acid, isophthalic acid, sebacic acid, adipic acid, p-carboxyphenoacetic acid, succinic acid, p,p′-dicarboxybiphenol, p,p′-dicarboxycarbanilide, p,p′-dicarboxythiocarbanilide, p,p′-dicarboxydiphenylsulfone, p-carboxyphenoxyacetic acid, p-carboxyphenoxypropionic acid, p-carboxyphenoxybutyric acid, p-carboxyphenoxyvaleric acid, p-carboxyphenoxyhexanoic acid, p-carboxyphenoxyheptanoic acid, p,p′-dicarboxydiphenylmethane, p,p′-dicarboxydiphenylethane, p,p′-dicarboxydiphenylpropane, p,p′-dicarboxydiphenylbutane, p,p′-dicarboxydiphenylpentane, p,p′-dicarboxydiphenylhexane, p,p′-dicarboxydiphenylheptane p,p′-dicarboxydiphenyloctane, p,p′-dicarboxydiphenoxyethane, p,p′ - dicarboxydiphenoxypropane, p,p′-dicarboxydiphenoxybutane, p,p′-dicarboxydiphenoxypentane, p,p'-dicarboxydiphenoxyhexane, 3-alkyl 4-(beta-carboxy ethoxy) benzoic acid, oxalic acid, glutaric acid, pimelic acid, suberic acid, azelaic acid and the dioxy acids of ethylene dioxide having the general formula, $$HOOC—(CH_2)_n—O—CH_2CH_2—O—(CH_2)_n—COOH$$

wherein $n$ is an integer from 1 to 4, and the aliphatic and cycloaliphatic aryl esters and half esters, ammonium and amine salts, and the acid halides of the above-named compounds and the like. Examples of the glycols which may be employed in practicing the instant invention are ethylene glycol, trimethylene glycol, tetramethylene glycol and decamethylene glycol, etc. Polyethylene terephthalate, however, is preferred because of the ready availability of terephthalic acid and ethylene glycol, from which it is made. It also has a relatively high melting point of about 250 through 255° C. and this property is particularly desirable in the manufacture of filaments in the textile industry.

Among the modified polyesters and copolyesters which are useful in the practice of the instant invention are the polyesters and copolyesters mentioned above modified with chain terminating groups having hydrophilic properties, such as the monofunctional ester-forming polyethers bearing the general formula, (I)    $R—O—[(CH_2)_mO]_x(CH_2)_n—OH$ wherein R is an alkyl group containing 1 to 18 carbon atoms or an aryl group containing 6 to 10 carbon atoms, and $m$ and $n$ are integers from 2 to 22, and $x$ is a whole number indicative of the degree of polymerization, that is, $x$ is an integer from 1 to 100 or greater. Examples of such compounds are methoxypolyethylene glycol, ethoxypolyethylene glycol, n-propoxypolyethylene glycol, isopropoxypolyethylene glycol, butoxypolyethylene glycol, phenoxypolyethylene glycol, methoxypolypropylene glycol, methoxypolybutylene glycol, phenoxypolypropylene glycol, phenoxypolybutylene glycol, methoxypolymethylene glycol, and the like. Suitable polyalkylvinyl ethers having one terminal hydroxyl group are the addition polymers prepared by the homopolymerization of alkylvinyl ethers wherein the alkyl group contains from 1 to 4 carbon atoms. Examples of such chain-terminating agents are hydroxy polymethylvinyl ether, hydroxy polyethylvinyl ether, hydroxy polypropylvinyl ether, hydroxy polybutylvinyl ether, hydroxy polyisobutylvinyl ether, and the like. The chain-terminating agents or compounds may be employed in the preparation of the modified polyesters in amounts ranging from 0.05 mol percent to 4.0 mol percent, based on the amount of dicarboxylic acid or dialkyl ester thereof employed in the reaction mixture. It is to be noted that when chain-terminating agents are employed alone, i.e., without a chain-branching agent, the maximum amount that can be employed in the reaction mixture is 1.0 mol percent. Thus, unexpectedly, the addition of controlled amounts of chain-branching agents along with the chain-terminating agents allows the introduction of an increased amount of the latter into the polymer chain than is otherwise possible when employing the chain-terminating agents alone.

One will readily appreciate that the weight percent of chain-terminating agent which may be employed in this invention will vary with the molecular weight of the agent. The range of average molecular weights of the chain-terminating agents suitable for use in this invention is from 500 to 5000, with those agents having a molecular weight in the range of 1000 to 3500 being preferred.

Materials suitable as chain-branching agents or cross-linking agents, which are employed to increase the viscosity or molecular weight of the polyesters, are the polyols which have a functionality greater than two, that is, they contain more than two functional groups, such as hydroxyl. Examples of suitable compounds are pentaerythritol; compounds having the formula:

(II)    $R—(OH)_n$ wherein R is an alkylene group containing from 3 to 6 carbon atoms and $n$ is an integer from 3 to 6, for example, glycerol, sorbitol, hexane triol-1,2,6, and the like; compounds having the formula:

(III)    $R—(CH_2OH)_3$ wherein R is an alkyl group containing from 2 to 6 carbon atoms, for example, trimethylol ethane, trimethylol propane, and like compounds up to trimethylol hexane; and the compounds having the formula:

(IV)

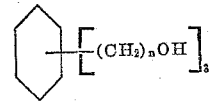

wherein $n$ is an integer from 1 to 6. As examples of compounds having the above formula there may be named trimethylol benzene-1,3,5, triethylol benzene-1,3,5, tripropylol benzene-1,3,5, tributylol benzene-1,3,5, etc.

Aromatic polyfunctional acid esters may also be employed in this invention as chain-branching agents and particularly those having the formula:

(V)

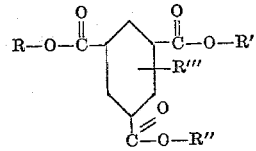

and in which R, R' and R'' are alkyl groups containing 1 to 3 carbon atoms and R''' is hydrogen or alkyl groups having 1 to 2 carbon atoms. As examples of compounds having the above formula there may be named trimethyl trimesate, tetramethyl pyromellitate, tetramethyl mellophonate, trimethyl hemimellitate, trimethyl trimellitate, tetramethyl prehnitate, and the like. In addition, there may be employed mixtures of the above esters which are obtained in practical synthesis. That is, in most instances when preparing any of the compounds having the above formula, other related compounds having the same formula may be present in small amounts as impurities. This does not affect the compound as a chain-branching agent in the preparation of the modified polyesters and copolyesters described herein.

The chain-branching agents or cross-linking agents may be employed in the preparation of the polyesters and copolyesters in amounts ranging from 0.05 mol percent to 2.4 mol percent, based on the amount of dicarboxylic acid or dialkyl ester thereof employed in the reaction mixture. The preferred range of chain-branching agent for use in the present invention is from 0.1 to 1.0 mol percent.

In the practice of the present invention, the calculated amounts of chain-terminating agent or chain-terminating agent and chain-branching agent or cross-linking agent are charged to the reaction vessel at the beginning of the first stage of the esterification reaction and the reaction proceeds as in any well-known esterification polymerization. The first step or stage of the reaction is carried out at atmospheric pressure and at a temperature in the range of 90° C. to 250° C. and preferably between 150° and 220° C. when from 0.001 to 1.0 percent by weight, based on the weight of the dicarboxylic acid or ester thereof, of a suitable esterification catalyst, such as manganous formate or zinc acetylacetonate, is employed. If desired, the reaction may be carried out at pressures above or below atmospheric. Methanol is evolved which is continuously removed by distillation. At the completion of the first stage, the excess glycol, if any, is distilled off prior to entering the second stage of the reaction.

In the second or polymerization stage, the reaction is conducted at reduced pressures and preferably in the presence of an inert gas, such as nitrogen, in order to prevent oxidation. This can be accomplished by maintaining a nitrogen blanket over the reactants, said nitrogen containing less than 0.003 percent oxygen. For optimum results, a pressure within the range of less than 1 mm. up to 5 mm. of mercury is employed. This reduced pressure is necessary to remove the free ethylene glycol that is formed during this stage of the reaction, the ethylene glycol being volatilized under these conditions and removed from the system. The polymerization step is conducted at a temperature in the range of 220° to 300° C. This stage of the reaction may be effected either in the liquid, melt or solid phase. In the liquid phase, particularly, reduced pressures must be employed in order to remove the free ethylene glycol which emerges from the polymer as a result of the condensation reaction.

In the preparation of the described polyesters, the first stage of the reaction takes place in approximately ¾ to 2 hours, when employing a suitable esterification catalyst. In the absence of a catalyst, times up to 6 hours may be necessary in order to complete this phase of the reaction. In the second stage, a reaction time of approximately 1 to 4 hours may be employed with a time of 1 to 3 hours being the optimum, depending on catalyst concentration, temperature, viscosity desired, amount of color allowable in the finished polymer, etc.

The modified linear condensation polyesters, produced in accordance with the present invention, have a specific viscosity in the range of 0.30 to 0.60, which represents the fiber- and filament-forming polymers. It is to be understood, of course, that non-fiber-forming polyesters may be produced by means of the present invention, which have a specific viscosity greater or less than that reiterated above and such polyesters are useful, for example, in the manufacture of coating compositions, lacqures, molding compositions, and the like. This specific viscosity range and variations thereof also are applicable to the unmodified polyesters, such as polyethylene terephthalate. The specific viscosity range of the fiber-forming polymers, that is, from 0.3 to about 0.6, indicates high molecular weight polymers of from about 10,000 to about 50,000 molecular weight.

If it is desired to produce shaped articles from the polyester solutions of the present invention which have a modified appearance or modified properties, various agents to accomplish these effects may be added to the polyester solutions of this invention prior to the fabrication of the articles without any ill effects thereon. Such added agents might be plasticizers, pigments, dyes, anti-static agents, fire-retarding agents, etc.

The following examples are intended to illustrate the new compositions of the invention more fully, but are not intended to limit the scope of the invention, for it is possible to effect many modifications therein. In the examples, all parts and percents are by weight unless otherwise indicated.

*Example I*

9 grams of pyrrole and 1 gram of polyethylene terephthalate were mixed together and warmed with stirring to 110° C. where the polymer readily dissolved yielding a clear fluid solution suitable for both wet or dry-spinning. On cooling, the solution solidified at 45° C. but was readily redissolved upon the application of heat. The solution was stable at temperatures above 45° C.

*Example II*

There was charged to a reaction vessel 82 grams of dimethyl terephthalate, 106.2 grams of ethylene glycol (approximately 88 ml.) and 8.2 grams of ethoxypolyethylene glycol having an average molecular weight of about 3050 (0.5 mol percent based on the mols of dimethyl terephthalate). Subsequently, 40 mg. of manganous formate was added to the reaction vessel. The reactants were well mixed and heated at 177° C. until solution was effected. The mixture was maintained at this temperature for 90 minutes to bring about the ester-interchange reaction. Thereafter, the temperature was raised to 225° C. to remove excess ethylene glycol and maintained at that temperature under a vacuum of less than 1 mm. of mercury for 3 hours to effect polymerization. There was obtained a high molecular weight polyester having a melting point of about 255° C. and a specific viscosity of about 0.3 at 25° C. calculated in a 2 to 1 mixture of phenol-trichlorophenol containing 0.5 percent by weight of polymer. 9 grams of pyrrole and 1 gram of the polyester so prepared were mixed together and warmed with stirring to 110° C. where the polymer readily dissolved yielding a clear solution suitable for both wet or dry spinning. The solution was stable at temperatures above 40° C.

*Example III*

The polyester prepared in accordance with the procedure of Example II but with approximately 16.4 grams of ethoxypolyethylene glycol (that is, about 1 mol percent based on the mols of dimethyl terephthalate) was mixed with 9 grams of pyrrole and warmed with stirring to 100° C. where the polymer readily dissolved yielding a clear solution suitable for both wet or dry-spinning. The solution was stable at temperatures above 40° C.

*Example IV*

8 grams of pyrrole and 2 grams of polyethylene terephthalate were mixed together and warmed with stirring to 100° C. where the polymer readily dissolved yielding a clear fluid solution suitable for both wet or dry-spinning. The solution was stable at temperatures above 40° C.

*Example V*

7.5 grams of pyrrole and 1 gram of polyethylene terephthalate were mixed together and warmed with stirring to 110° C. where the polymer readily dissolved yielding a clear solution suitable for both wet or dry-spinning. The solution was stable at temperatures above 55° C.

*Example VI*

There was charged to a reaction vessel 1650 grams of dimethyl terephthalate, 1980 grams (approximately 1775 ml.) of ethylene glycol and 165 grams of methoxypolyethylene glycol having an average molecular weight of about 2000 (1.0 mol percent based on the mols of dimethyl terephthalate). There was also added to the reaction vessel 1.32 grams of pentaerythritol. Subsequently, 1.07 grams of zinc acetylacetonate were added to the reaction vessel. The reactants were well mixed and heated for about 90 minutes at atmospheric pressure and at a temperature gradually raised from 155° C. to 198° C. until solution was effected. During this time methyl alcohol which was formed in the reaction was removed by distillation. Subsequently, the reactants were heated for about 45 minutes under atmospheric pressure at a temperature which was gradually raised from 198° C. to 240° C. to remove excess ethylene glycol. Then the temperature was raised from 240° C. to about 280° C. over a period of about 5 minutes while the pressure was gradually decreased from atmospheric pressure to about 1 mm. of mercury. The reaction mixture was subjected for about 1½ hours to 280° C. and about 1 mm. of mercury to effect polymerization. There was obtained a high molecular weight polyester having a melting point of about 255° C. and a specific viscosity of 0.50 at 25° C. calculated in a 2 to 1 mixture of phenol-trichloro-phenol containing 0.5 percent by weight of polymer. 3.3 grams of the polyester so prepared and 6.7 grams of pyrrole were mixed together and heated with stirring to about 100° C. where the polyester readily dissolved yielding a clear solution suitable for both wet or dry-spinning. The solution was stable at temperatures above 50° C.

*Example VII*

0.5 gram of the polyester employed in Example VI and 9.5 grams of pyrrole were mixed together and heated with stirring to 90° C. where the polymer readily dissolved yielding a clear solution suitable for the formation of a light coating. The solution was stable at temperatures above 45° C.

The polyester compositions of this invention can be usefully employed in the coating field, for example, in the coating of textile fabrics. Thus, a fabric can be coated and/or impregnated with the polyester solutions described herein and then treated, that is soaked, in a non-solvent for the polyester in order to precipitate the polyester in and on the fabric. Metals, paper and impervious films may also be coated with the polyester compositions of this invention by conventional and well-known procedures.

One of the principal advantages of the instant invention is that it provides polyester compositions which are readily convertible to useful shaped articles by the wet or dry-spinning methods which are more economical than the melt-spinning method. Numerous other advantages of this invention will be apparent to those skilled in the art from reading the instant description.

As many apparently widely different embodiments of this invention may be made without departing from the spirit and scope thereof, it is to be understood that the same is not to be limited to the specific embodiments thereof, except as defined in the appended claims.

We claim:

1. A new composition of matter comprising a solution of a synthetic linear condensation polyester dissolved in pyrrole, said polyester being selected from the group consisting of (A) polyesters formed by the reaction of at least one dicarboxylic acid selected from the group consisting of aromatic dicarboxylic acids and aliphatic dicarboxylic acids and at least one glycol of the series $HO(CH_2)_nOH$ wherein $n$ is an integer from 2 to 10, (B) the polyesters of (A) modified by 0.05 mol percent to 1.0 mol percent, based on the total weight of said dicarboxylic acid, of a chain terminator selected from the group consisting of polyalkylvinyl ethers having one terminal hydroxyl group wherein the alkyl group contains 1 to 4 carbon atoms, and compounds having the formula, (I)      R—O—[(CH$_2$)$_m$O]$_x$(CH$_2$)$_n$—OH wherein R is selected from the group consisting of alkyl groups containing 1 to 18 carbon atoms and aryl groups containing 6 to 10 carbon atoms, $m$ and $n$ are integers from 2 to 22, and $x$ is an integer from 1 to 100, indicative of the degree of polymerization, and (C) the polyesters of (B) containing 0.05 mol percent to 4.0 mol percent, based on the total weight of said dicarboxylic acid, of said chain terminator, modified by 0.05 mol percent to 2.4 mol percent, based on the total weight of said dicarboxylic acid, of a chain-branching agent selected from the group consisting of pentaerythritol, compounds having the formula, (II)     R—(OH)$_n$ wherein R is an alkylene group containing from 3 to 6 carbon atoms and $n$ is an integer from 3 to 6, compounds having the formula, (III)     R—(CH$_2$OH)$_3$ wherein R is an alkylene group containing from 2 to 6 carbon atoms, compounds having the formula, (IV) 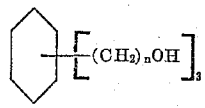

wherein $n$ in an integer from 1 to 6, and compounds having the formula, (V) 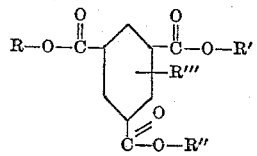

wherein R, R' and R'' are alkyl groups containing 1 to 3 carbon atoms and R''' is selected from the group consisting of hydrogen, methyl and ethyl radicals.

2. A new composition of matter as defined in claim 1 wherein the polyester is polyethylene terephthalate.

3. A new composition of matter comprising a solution of a synthetic linear condensation polyester dissolved in pyrrole, said polyester being selected from the group consisting of (A) polyesters formed by the reaction of at least one dicarboxylic acid selected from the group consisting of aromatic dicarboxylic acids and aliphatic dicarboxylic acids and at least one glycol of the series $HO(CH_2)_nOH$ wherein $n$ is an integer from 2 to 10, (B) the polyesters of (A) modified by 0.05 mol percent to 1.0 mol percent, based on the total weight of said dicarboxylic acid, of a chain terminator selected from the group consisting of polyalkylvinyl ethers having one terminal hydroxyl group wherein the alkyl group contains 1 to 4 carbon atoms, and compounds having the formula, (I)     R—O—[(CH$_2$)$_m$O]$_x$(CH$_2$)$_n$—OH wherein R is selected from the group consisting of alkyl groups containing 1 to 18 carbon atoms and aryl groups containing 6 to 10 carbon atoms, $m$ and $n$ are integers from 2 to 22, and $x$ is an integer from 1 to 100, indicative of the degree of polymerization, and (C) the polyesters of (B) containing 0.05 mol percent to 4.0 mol percent, based on the total weight of said dicarboxylic acid, of said chain terminator, modified by 0.05 mol percent to 2.4 mol percent, based on the total weight of said dicarboxylic acid, of a chain-branching agent selected from the group consisting of pentaerythritol, compounds having the formula, (II)     R—(OH)$_n$ wherein R is an alkylene group containing from 3 to 6 carbon atoms and $n$ is an integer from 3 to 6, and compounds having the formula, (III)     R—(CH$_2$OH)$_3$ wherein R is an alkylene group containing from 2 to 6 carbon atoms, compounds having the formula, (IV) 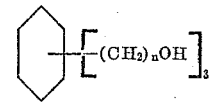

wherein $n$ is an integer from 1 to 6, and compounds having the formula, (V) 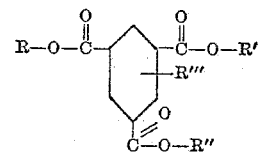

wherein R, R' and R'' are alkyl groups containing 1 to 3 carbon atoms and R''' is selected from the group consisting of hydrogen, methyl and ethyl radicals, said solvent being employed in a range of 75 to 90 percent, based on the total weight of the composition.

4. A new fiber-forming composition of matter comprising a miscible mixture of 10 to 25 percent, based on the total weight of the composition, of polyethylene terephthalate, having a molecular weight of at least 10,000 and pyrrole.

5. A process for preparing a new composition of matter comprising mixing a synthetic linear condensation polyester with pyrrole and heating the mixture to a temperature in a range of 90° C. to the boiling point of the mixture to form a homogeneous solution, said polyester being selected from the group consisting of (A) polyesters formed by the reaction of at least one dicarboxylic acid selected from the group consisting of aromatic dicarboxylic acids and aliphatic dicarboxylic acids and at least one glycol of the series $HO(CH_2)_nOH$ wherein $n$ is an integer from 2 to 10, (B) the polyesters of (A)

modified by 0.05 mol percent to 1.0 mol percent, based on the total weight of said dicarboxylic acid, of a chain terminator selected from the group consisting of polyalkylvinyl ethers having one terminal hydroxyl group wherein the alkyl group contains 1 to 4 carbon atoms, and compounds having the formula, (I)      R—O—[(CH$_2$)$_m$O]$_x$(CH$_2$)$_n$—OH wherein R is selected from the group consisting of alkyl groups containing 1 to 18 carbon atoms and aryl groups containing 6 to 10 carbon atoms, $m$ and $n$ are integers from 2 to 22, and $x$ is an integer from 1 to 100, indicative of the degree of polymerization, and (C) the polyesters of (B) containing 0.05 mol percent to 4.0 mol percent, based on the total weight of said dicarboxylic acid, of said chain terminator, modified by 0.05 mol percent to 2.4 mol percent, based on the total weight of said dicarboxylic acid, of a chain-branching agent selected from the group consisting of pentaerythritol, compounds having the formula, (II)      R—(OH)$_n$ wherein R is an alkylene group containing from 3 to 6 carbon atoms and $n$ is an integer from 3 to 6, compounds having the formula, (III)      R—(CH$_2$OH)$_3$ wherein R is an alkylene group containing from 2 to 6 carbon atoms, compounds having the formula, (IV)
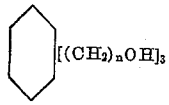

wherein $n$ is an integer from 1 to 6, compounds having the formula, (V)
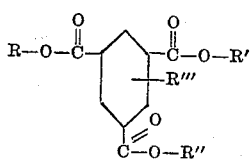

wherein R, R' and R'' are alkyl groups containing 1 to 3 carbon atoms and R''' is selected from the group consisting of hydrogen, methyl and ethyl radicals.

6. The process for preparing a miscible fiber-forming composition of matter which comprises mixing 10 to 25 percent, based on the total weight of the composition, of a synthetic linear condensation polyester with pyrrole and heating the mixture to a temperature in a range of 90° C. to the boiling point of the mixture to form a homogeneous solution, said polyester being selected from the group consisting of (A) polyesters formed by the reaction of at least one dicarboxylic acid selected from the group consisting of aromatic dicarboxylic acids and aliphatic dicarboxylic acids and at least one glycol of the series HO(CH$_2$)$_n$OH wherein $n$ is an integer from 2 to 10, (B) the polyesters of (A) modified by 0.05 mol percent to 1.0 mol percent, based on the total weight of said dicarboxylic acid, of a chain terminator selected from the group consisting of polyalkylvinyl ethers having one terminal hydroxyl group wherein the alkyl group contains 1 to 4 carbon atoms, and compounds having the formula, (I)      R—O—[(CH$_2$)$_m$O]$_x$(CH$_2$)$_n$—OH wherein R is selected from the group consisting of alkyl groups containing 1 to 18 carbon atoms and aryl groups containing 6 to 10 carbon atoms, $m$ and $n$ are integers from 2 to 22, and $x$ is an integer from 1 to 100, indicative of the degree of polymerization, and (C) the polyesters of (B) containing 0.05 mol percent to 4.0 mol percent, based on the total weight of said dicarboxylic acid, of said chain terminator, modified by 0.05 mol percent to 2.4 mol percent, based on the total weight of said dicarboxylic acid, of a chain-branching agent selected from the group consisting of pentaerythritol, compounds having the formula, (II)      R—(OH)$_n$ wherein R is an alkylene group containing from 3 to 6 carbon atoms and $n$ is an integer from 3 to 6, compounds having the formula (III)      R—(CH$_2$OH)$_3$ wherein R is an alkylene group containing from 2 to 6 carbon atoms, compounds having the formula, (IV)
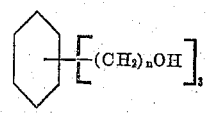

wherein $n$ is an integer from 1 to 6, compounds having the formula, (V)
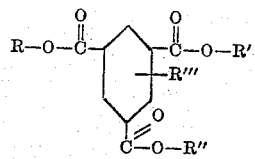

wherein R, R' and R'' are alkyl groups containing 1 to 3 carbon atoms and R''' is selected from the group consisting of hydrogen, methyl and ethyl radicals.

7. A new composition of matter as defined in claim 1 wherein the polyester is polyethylene terephthalate and the chain terminator is ethoxypolyethylene glycol.

8. A new composition of matter as defined in claim 1 wherein the polyester is polyethylene terephthalate and the chain terminator is hydroxy polymethylvinyl ether.

9. A new composition of matter as defined in claim 1 wherein the polyester is polyethylene terephthalate and the chain terminator is methoxypolyethylene glycol.

10. A new composition of matter as defined in claim 1 wherein the polyester is polyethylene terephthalate and the chain terminator is propoxypolyethylene glycol.

11. A new composition of matter as defined in claim 1 wherein the polyester is polyethylene terephthalate and the chain terminator is isopropoxypolyethylene glycol.

12. A new composition of matter as defined in claim 1 wherein the polyester is polyethylene terephthalate, the chain terminator is methoxypolyethylene glycol and the chain branching agent is trimethyl trimesate.

13. A new composition of matter as defined in claim 1 wherein the polyester is polyethylene terephthalate, the chain terminator is methoxypolyethylene glycol and the chain branching agent is pentaerythritol.

14. A new composition of matter as defined in claim 1 wherein the polyester is polyethylene terephthalate, the chain terminator is methoxypolyethylene glycol and the chain branching agent is tripropyl trimesate.

15. A new composition of matter as defined in claim 1 wherein the polyester is polyethylene terephthalate, the chain terminator is methoxypolyethylene glycol and the chain branching agent is glycerol.

16. A new composition of matter as defined in claim 1 wherein the polyester is polyethylene terephthalate, the chain terminator is methoxypolyethylene glycol and the chain branching agent is sorbitol.

17. The process defined in claim 5 wherein the polyester is polyethylene terephthalate and the chain terminator is methoxypolyethylene glycol.

18. The process defined in claim 5 wherein the polyester is polyethylene terephthalate and the chain terminator is ethoxypolyethylene glycol.

19. The process defined in claim 5 wherein the polyester is polyethylene terephthalate, the chain terminator is methoxypolyethylene glycol and the chain branching agent is pentaerythritol.

20. The process defined in claim 5 wherein the polyester is polyethylene terephthalate, the chain terminator is methoxypolyethylene glycol and the chain branching agent is trimethyl trimesate.

No references cited.